United States Patent
Chien et al.

(10) Patent No.: US 7,616,605 B2
(45) Date of Patent: Nov. 10, 2009

(54) METHOD FOR CONFIGURING A WIRELESS DISTRIBUTION SYSTEM AND OPTIMIZE METHOD THEREOF

(75) Inventors: Chun-Chou Chien, Ji-an Township, Hualien County (TW); Yi-Zhan Huang, Taipei (TW); Chin-Ta Lin, Taishan Township, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 371 days.

(21) Appl. No.: 11/319,819

(22) Filed: Dec. 27, 2005

(65) Prior Publication Data

US 2007/0076642 A1    Apr. 5, 2007

(30) Foreign Application Priority Data

Sep. 27, 2005    (TW) .............................. 94133513 A (51) Int. Cl.
*H04W 4/00*    (2006.01)
(52) U.S. Cl. ...................... 370/329; 370/328; 370/338; 455/435.1; 455/450; 455/451; 455/452.1
(58) Field of Classification Search ................. 455/450, 455/451, 452.1, 455; 370/328–338
See application file for complete search history.

(56) References Cited

U.S. PATENT DOCUMENTS

| | | | |
|---|---|---|---|
| 5,592,468 A | 1/1997 | Sato ........................... 370/252 |
| 5,682,476 A | 10/1997 | Tapperson et al. .......... 370/225 |
| 6,236,334 B1 | 5/2001 | Tapperson et al. ..... 340/825.37 |
| 6,272,117 B1 * | 8/2001 | Choi et al. ................... 370/330 |
| 6,272,120 B1 | 8/2001 | Alexander .................. 370/338 |
| 6,393,261 B1 | 5/2002 | Lewis ......................... 455/103 |
| 6,452,910 B1 | 9/2002 | Vij et al. ..................... 370/310 |
| 6,674,738 B1 | 1/2004 | Yildiz et al. ................ 370/338 |
| 6,718,387 B1 * | 4/2004 | Gupta et al. ................ 709/226 |
| 6,807,165 B2 * | 10/2004 | Belcea ........................ 370/347 |
| 6,822,946 B1 | 11/2004 | Wallace ...................... 370/328 |
| 6,879,812 B2 | 4/2005 | Agrawal et al. .......... 455/67.11 |
| 7,054,640 B2 * | 5/2006 | Bing et al. ............... 455/452.1 |
| 2004/0224698 A1 | 11/2004 | Yi et al. ...................... 455/450 |
| 2006/0109815 A1 * | 5/2006 | Ozer et al. .................. 370/329 |

* cited by examiner

*Primary Examiner*—Nick Corsaro
*Assistant Examiner*—Vladimir Magloire
(74) *Attorney, Agent, or Firm*—J.C. Patents (57) ABSTRACT

A method for configuring a wireless distribution system is provided. In the method, a target node starts a building procedure and begins to broadcast a building information. A joining node starts a scanning procedure for scanning all channels available and locks one channel used by the target node. The joining node sends a connect request signal and a channel assign request to the target node. The target node selects one link and one channel available for the joining node for communication, and sends a channel reset signal to the joining node. The MAC address of the joining node is added into an internal table of the target node. After the joining node has received the channel reset signal, the MAC address of the target node is stored into an internal table of the joining node, and the designated link channel is configured.

5 Claims, 10 Drawing Sheets

| Octets: 2 | 2 | 6 | 6 | 6 | 2 | 6 | 0~2312 | 4 |
|---|---|---|---|---|---|---|---|---|
| Frame Control | Duration / ID | Address 1 | Address 2 | Address 3 | Sequence Control | Address 4 | Frame Body | FCS |

FIG.2B content of address fields

| function | To DS | From DS | Address 1 | Address 1 | Address 1 | Address 1 |
|---|---|---|---|---|---|---|
| IBSS | 0 | 0 | DA | SA | BSSID | N/A |
| to AP | 0 | 1 | DA | BSSID | SA | N/A |
| from AP | 1 | 0 | BSSID | SA | DA | N/A |
| WDS | 1 | 1 | RA | TA | DA | SA |

METHOD FOR CONFIGURING A WIRELESS DISTRIBUTION SYSTEM AND OPTIMIZE METHOD THEREOF

CROSS-REFERENCE TO RELATED APPLICATION

This application claims the priority benefit of Taiwan application serial no. 94133513, filed on Sep. 27, 2005. All disclosure of the Taiwan application is incorporated herein by reference.

BACKGROUND OF THE INVENTION

1. Field of Invention

The present invention relates to a method for configuring a wireless distribution system and optimize method thereof. More particularly, the present invention relates to a method for configuring a wireless distribution system and optimize method thereof, wherein a new wireless distribution system link is dynamically added such that the wireless distribution system network can give the optimized performance.

2. Description of Related Art

Figure 1:
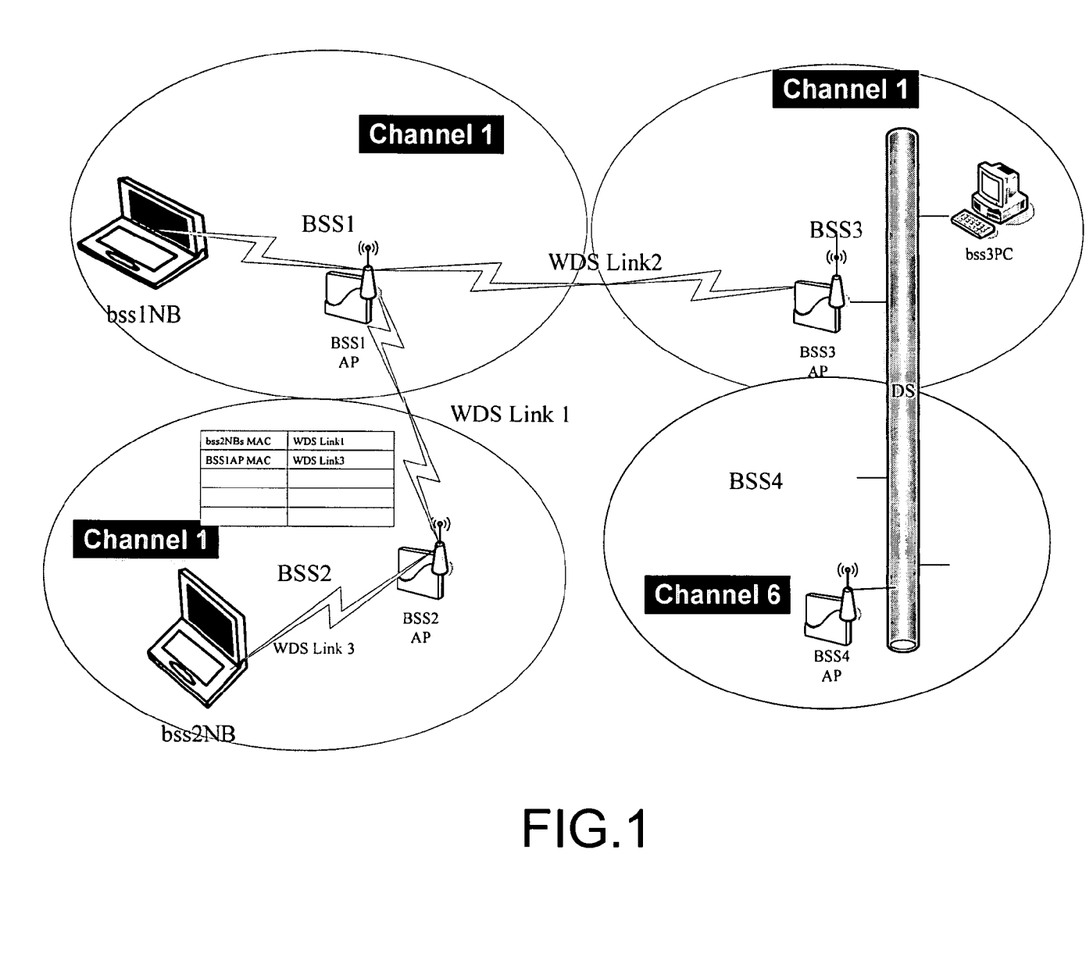
FIG. 1 is a schematic view of distribution system (DS) architecture and wireless distribution system (WDS) architecture.

Distribution System (DS) is defined in IEEE802.11 specification as a system for linking two different Basic Service Sets (BSS). Referring to FIG. 1, for BSS3 and BSS4 in the right half, the manner of linking their Access Points (AP) BSS3AP and BSS4AP with network cables is referred to as a DS. And for BSS1 and BSS2 on the left half, their APs BSS1AP and BSS2AP are linked in a wireless manner, which is referred to as a Wireless Distribution System (WDS).

The wireless AP having the WDS function is different from a common AP in that it has multiple roles, i.e. besides for serving the mobile clients, it can also be WDS linked with other APs directly, to expand the existing service range of the wireless network. As shown in FIG. 1, BSS3AP (the AP of BSS BSS3) builds a WDS link (WDS Link2 as shown) with BSS1AP (the AP of BSS BSS1), and also builds another WDS link (WDS Link1 as shown) with BSS2AP (the AP of BSS BSS2), so the AP BSS4AP can communicate with the AP BSS2AP through the forwarding of the WDS. And the notebook connected to the AP BSS2AP (bss1NB as shown) can also be linked to the wired network on the right through the WDS.

Since the network cards at the same wireless AP have to use the same channel, the two BSSs linked through the AP have to use the same channel, and that is the reason why BSS1, BSS2 and BSS3 all use the same channel in FIG. 1.

Figure 2A:
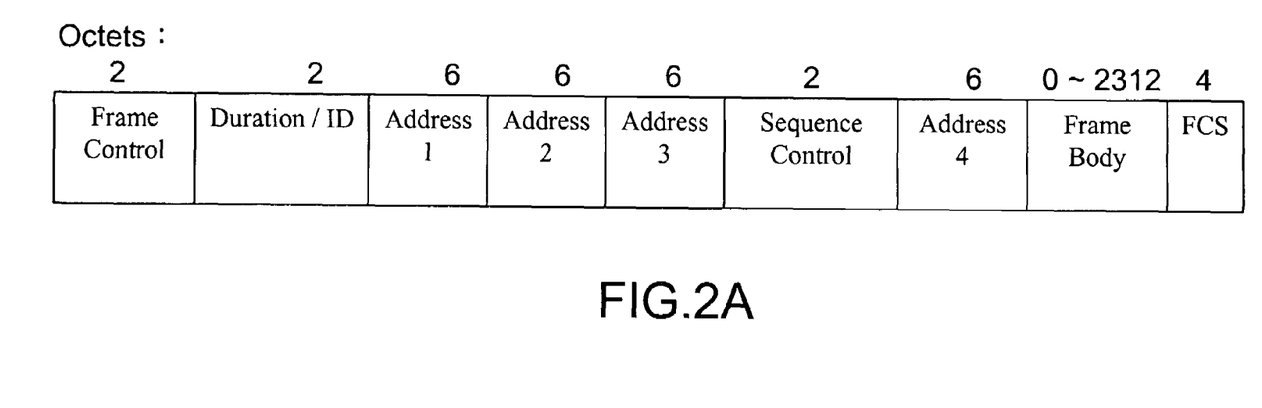
FIG. 2A shows a frame architecture containing four addresses of the WDS.

The operation of the WDS is to communicate with each other through a frame including four addresses. Referring to FIG. 2A, the frame includes several fields such as a Frame Control field, a Duration/ID field, an Address 1 field, an Address 2 field, an Address 3 field, a Sequence Control field, an Address 4 field, a Frame Body field and a Frame Check Sequence (FCS) field. In the frame, the numbers of Octets in each field are respectively: 2 Octets in the Frame Control field, 2 Octets in the Duration/ID field, 6 Octets in the Address 1 field, 6 Octets in the Address 2 field, 6 Octets in the Address 3 field, 2 Octets in the Sequence Control field, 6 Octets in the Address 4 field, 0~2312 Octets in the Frame Body field, and 4 Octets in the FCS field.

Figure 2B:
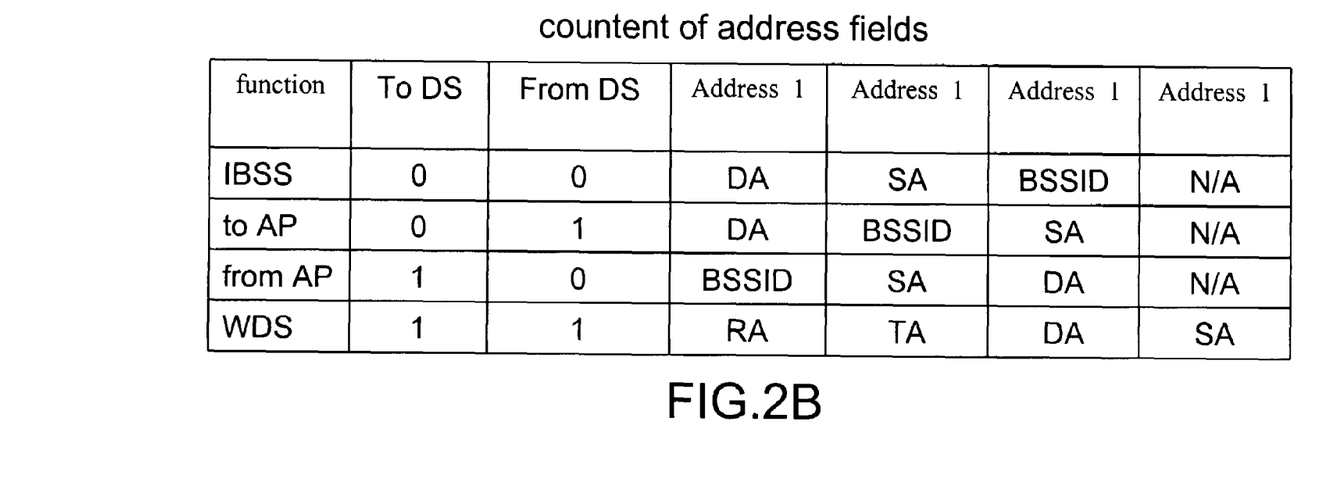
FIG. 2B shows the content of the four address fields in the WDS frame architecture of FIG. 2A.

The content in the four address fields are as shown in FIG. 2 respectively. The WDS frame in the drawing includes SA representing a media access control (MAC) address of a source terminal, DA representing a MAC address of a destination terminal, TA representing a MAC address of an AP for forwarding frames, and RA representing a MAC address of a receiving terminal AP.

Taking FIG. 1 as an example, if a client terminal bss2NB connected with the access point BSS2AP within BSS2 is going to send data to another client terminal bss1NB connected with the access point BSS1AP within BSS1, the frame content will includes in sequence: the MAC address of the BSS1AP, the MAC address of the BSS2AP, the MAC address of the destination client bss1NB and the MAC address of the source client bss2NB.

The BSS2AP inquires through a WDS table of itself, forwards the frame to BSS1AP, and then sends it to the destination client bss1NB.

The following is the flow of configuring a WDS in the prior art:

(1) Before configuration, inquire and write down the wireless MAC addresses of the access point BSS1 AP and the access point BSS2 AP.

(2) Start the WDS function of BSS1 AP and BSS2 AP.

(3) Add each of the MAC addresses to the WDS Table of the other party.

(4) Configure two APs for using the same channel.

(5) Restart.

The existing wireless network AP have to configure its MAC Table and adjust the Channel settings manually when configuring the WDS Link, meanwhile, it can not perform optimize when adding or reducing the nodes.

SUMMARY OF THE INVENTION

Accordingly, the present invention directs to provide a method for configuring WDS, wherein the steps of manual configuration can be reduced, and new WDS links can be added dynamically, to optimize the performance of the WDS network.

In an embodiment of the present invention, a method for configuring wireless distribution system is provided. In the method, a target node starts a building procedure and begins to broadcast a building information. A joining node starts a scanning procedure for obtaining and locking one channel used by the target node. The joining node sends a connect request signal to the target node. The target node selects one link and assigns it to the above joining node, and then sends a connect acknowledge signal to the above joining node. The joining node sends a channel assign request to the above target node, requiring the target node to assign a channel. The target node selects a channel available and sends a channel reset signal to the joining node. The MAC address of the joining node is stored into an internal table of the target node. After the joining node has received the channel reset signal, the MAC address of the target node is stored into an internal table of the joining node, and the designated link channel is configured.

In the above-described method for configuring wireless distribution system, the scanning procedure of the joining node scans all channels listed in a scan channel list, and after a scan report is obtained, it obtains and locks one channel used by the target node according to the scan report.

In the above-described method for configuring wireless distribution system, if the above target node has no available link to be assigned to the above joining node, it will send a link assign failure signal to the above joining node, and the target node and above joining node can not be communicated with each other.

In the above-described method for configuring wireless distribution system, if the target node belongs to a first wireless distribution system network, and the joining node belongs to a second wireless distribution system network, when the joining node discoveries a conflict between channels according to the information of the target node, the joining node will unicast a channel conflict message to other nodes in the second wireless distribution system network and request for changing the channels, and the other nodes having received the channel conflict message also send the unicast channel conflict message, furthermore, the joining node also requests other nodes to change the Root node of the first wireless distribution system network as the Root node thereof.

In an embodiment of the present invention, a distributional optimize method for configuring a wireless distribution system network is provided, which comprises notifying all nodes by broadcast to adjust to the same channel by the Root node of the wireless distribution system network. This Root node sends optimize data to all nodes, and after these nodes have received the optimize data, they broadcast the optimize data with their own information added. After a given time, they will stop sending the above optimize data and their own information, and select a parent node from the received optimize data and the information of other nodes. Then perform a joining procedure, and join into the wireless distribution system network architecture under the Root directory.

In the above distributional optimize method for configuring, the above joining procedure is a method of joining a joining node into a target node, comprising sending a connect request signal to the target node by the joining node. The target node selects a link and assigns it to the joining node, then sends a connect acknowledge signal to the joining node. The joining node sends a channel assign request to the target node, for requesting the target node to assign a channel. The target node selects a channel available and sends a channel reset signal to the joining node. The MAC address of the joining node is stored into the internal table thereof. And after the joining node has received the channel reset signal, the MAC address of the target node is stored into an internal table thereof, and the above designated link channel is configured.

In the above distributional optimize method for configuring a wireless distribution system network, the optimize data comprising the channels available for the Root node, the number of the links available, and the power of the Root node and the like.

In an embodiment of the present invention, a central control optimize method for configuring a wireless distribution system network is provided, which comprises notifying all nodes by broadcast to adjust to the same channel by a Root node of the wireless distribution system network. The Root node sends a Discovery message requesting the above nodes to provide information, and the above nodes reply the message to acknowledge their reception. Each node having received the discovery message will send its information back to the Root node. And the Root node performs calculation according to those received node information and sends the result to each node, while each node rebuild a wireless distribution system link according to the result sent by the Root node, thereby to realize an optimized configuration.

In the above central control optimize method for configuring a network, the optimize data comprising the channels available for the Root node, the number of the links available, and the power of the Root node and the like.

In order to the make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention provides a method for configuring a wireless distribution system (WDS). The steps of manual configuration can be reduced so as to optimize the WDS network performance. The protocol built by the WDS provided in the present invention can add new WDS links dynamically to realize the function of building WDS links between access points (APs) automatically, and can perform optimization after the link is built, so as to improve the use of the network resource. The content of this protocol built by WDS comprises three parts of algorithm: (1) building a new WDS link; (2) incorporating the WDS network between nodes belonging to two different groups; and (3) optimizing the WDS link.

Part One: Building a New Link

Figure 3A:
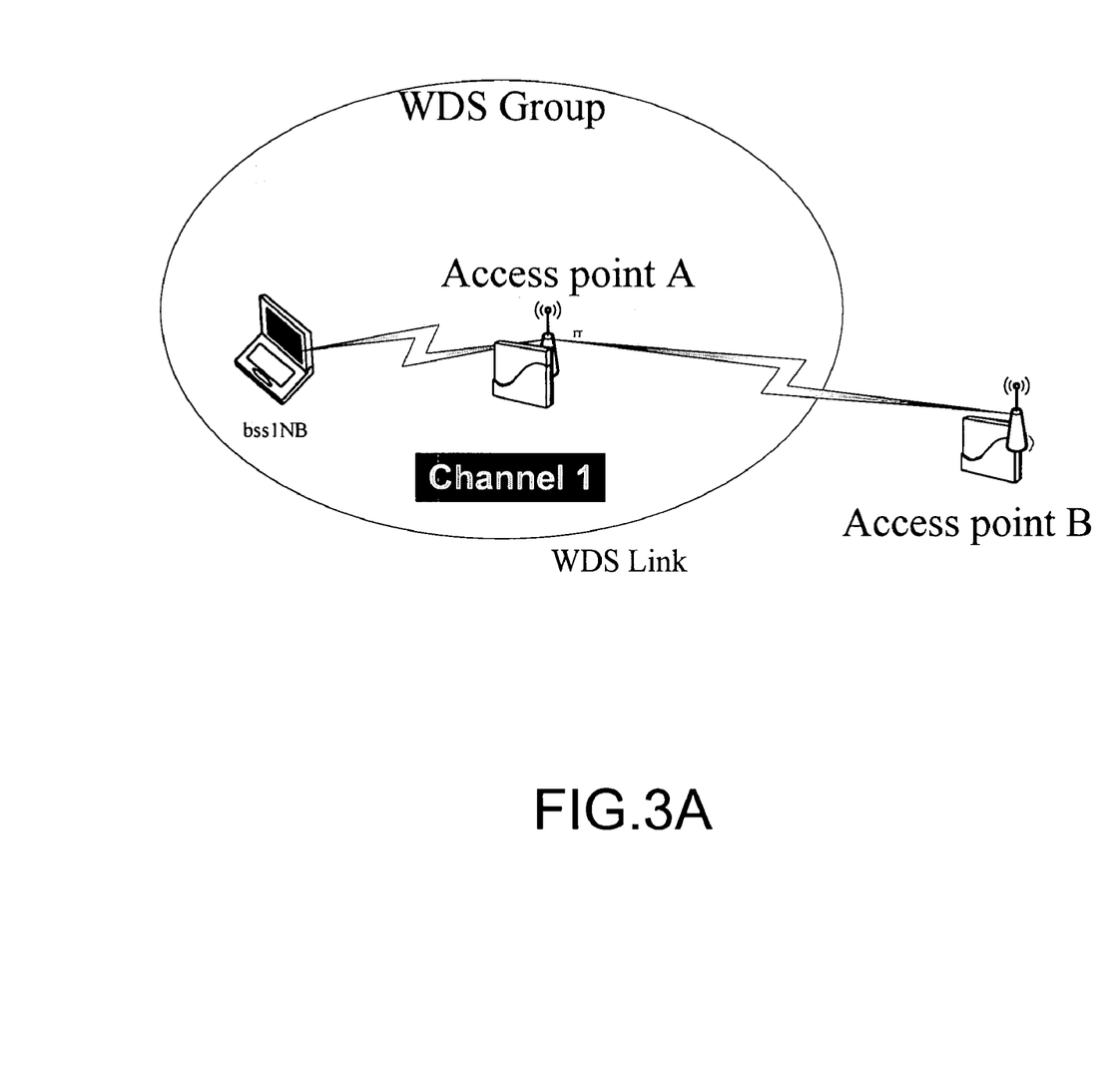
FIG. 3A shows a schematic view of a network architecture wherein node B is to be joined into the existing WDS group, and linked with node A.

First, a new node B is to build a WDS link to a node A already existing in a WDS group. As shown in FIG. 3A, node B (i.e. AP B as shown) is to join into the existing WDS group, and linked with the node A (i.e. AP A as shown, not the root node). The process of building a new link includes a scanning procedure, a building procedure and a joining procedure, which will be described in details referring to FIG. 3B below.

First, the scanning procedure and the building procedure are defined.

Scanning procedure: The object of scanning is to discovery an AP that can be used for building WDS links, and the following parameters will be used:

ScanChannelList—the listed Channels required to be scanned, usually all the Channels that can be supported;

MinChannelScanTime—the minimum time of scanning taken by each channel;

MaxChannelScanTime—the maximum time of scanning taken by each channel.

A ScanReport will be generated after the scanning is finished, in which the nodes can be used for building WDS links are listed. If the ScanReport reports no node can be joined, each node will continue to scan or set itself as a Root node.

Building procedure: The object of building is to send WDS link building information, and wait for the reply message from the receiving terminal and then build the WDS link, and the following parameters will be used:

MinBuildingTime—the maximum time of building a WDS link.

MaxBuildingTime—the minimum time of building a WDS link.

AvailableLinks—the number of the links available.

Channeland AvailableChannel—the number of the channels available.

OtherInformation—other information, such as Root information or others.

Figure 3B:
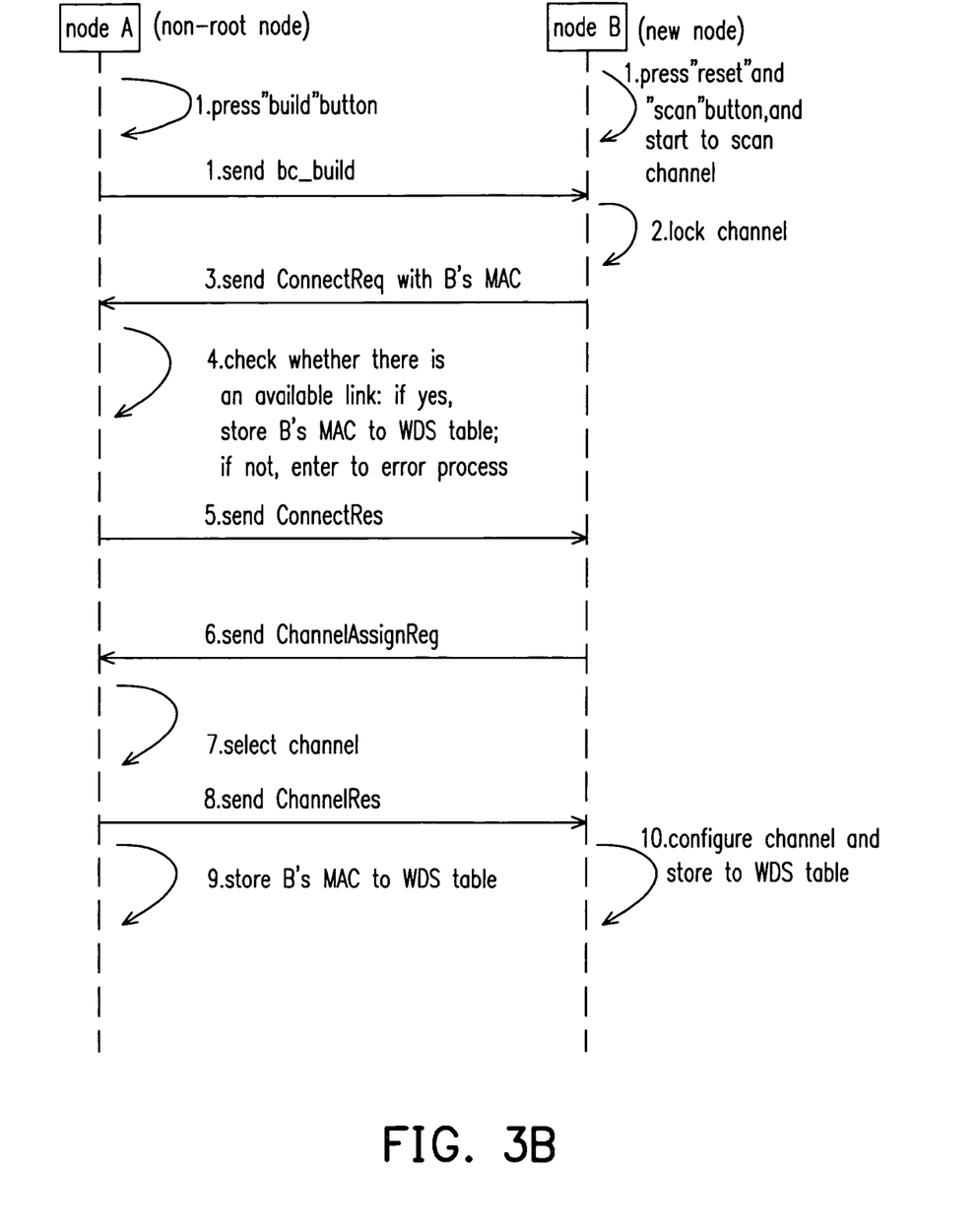
FIG. 3B shows the process flow of building a new link between node A and node B according to a preferred embodiment of the present, including Scanning procedure, Building procedure and Joining procedure.

The method for building the process flows will be described in details as follows with reference to the marked steps of FIG. 3B.

Scanning Procedure and Building Procedure:

Step 1: node A starts the building procedure and begins to broadcast bc_build signal, wherein the bc_build signal includes a Media Access Control (MAC) address of node A, and a broadcasting time is set to be between MinBuildTime and MaxBuildTime. A new node B presses the button of reset, and starts the scanning procedure, which performs scanning according to the listed channels in the ScanChannelList, and the scanning time is between MinChannelScanTime and MaxChannelScanTime.

Step 2: after node B finishes scanning, a ScanReport is obtained, in which the scanned result is listed, and node B will choose the node to be joined, which is node A according to this exemplary flow, according to its Join strategy, and locks the channel used by node A.

Joining Procedure:

Step 3: node B sends a connect request (i.e. "ConnectReq", which includes a MAC address of node B) to node A.

Step 4: node A checks whether there is an available link or not. If there is one link available, the MAC address of node B is stored to an internal table of node A, which can be a WDS Table according to an alternative embodiment. If there is no link available, it enters to the error process, which will be described in FIG. 3C below. Step 5: if node A has an available link, it selects one link and assign it to node B, then send a ConnectRes signal to node B.

Step 6: node B sends a ChannelAssignReq signal to node A, for requesting node A to assign a channel.

Step 7: node A selects an available channel.

Step 8: after node A selects the channel, it sends the ChannelRes signal to node B.

Step 9: node A stores the MAC address of node B to an internal table thereof, which can be a WDS Table according to an alternative embodiment.

Step 10: after node B receives ChannelRes, it stores the MAC address of node A to the WDS table and configures this designated link channel.

The above process of building a new link comprises a Scanning procedure, a Building procedure and a Joining procedure.

Figure 3C:
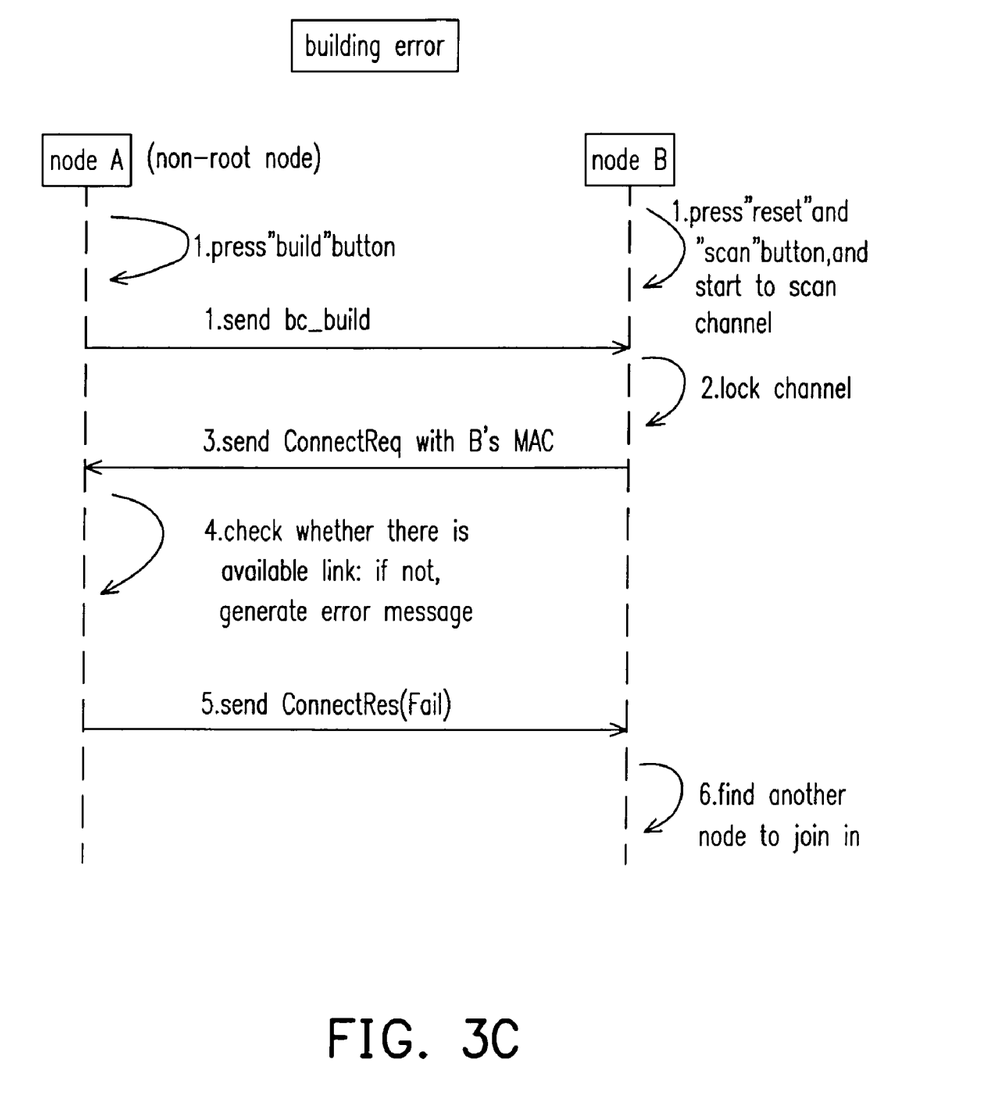
FIG. 3C shows the process flow of building a new link between node A and node B if an error occurs.

And if node B fails to join into an existing WDS group, refer to the description of building error of FIG. 3C.

Step 1: node A starts the building procedure and begins to broadcast bc_build, wherein the bc_build comprises the MAC address of node A, and the broadcasting time is between MinBuildTime and MaxBuildTime. And new node B presses the button of reset, and starts the scanning procedure, to scan according to the listed channels in the ScanChannelList, and the scanning time is between MinChannelScanTime and MaxChannelScanTime.

Step 2: after node B finishes scanning, a ScanReport is obtained, in which the scanned result is listed, and node B will choose the node to be joined, which is node A according to this exemplary flow, according to its Join strategy, and locks the channel used by node A.

Step 3: node B sends a connect request (i.e. "ConnectReq", which comprises the MAC address of node B) to node A.

Step 4: node A checks whether there is an available link nor not.

Step 5: if node A has no available link, it sends ConnectRes (Fail) message to node B.

Step 6: after node B receives the ConnectRes(Fail) message, it discoveries another node to be joined.

Part two: Building a WDS Link Between Two Nodes Built in Different WDS Networks

Figure 4A:
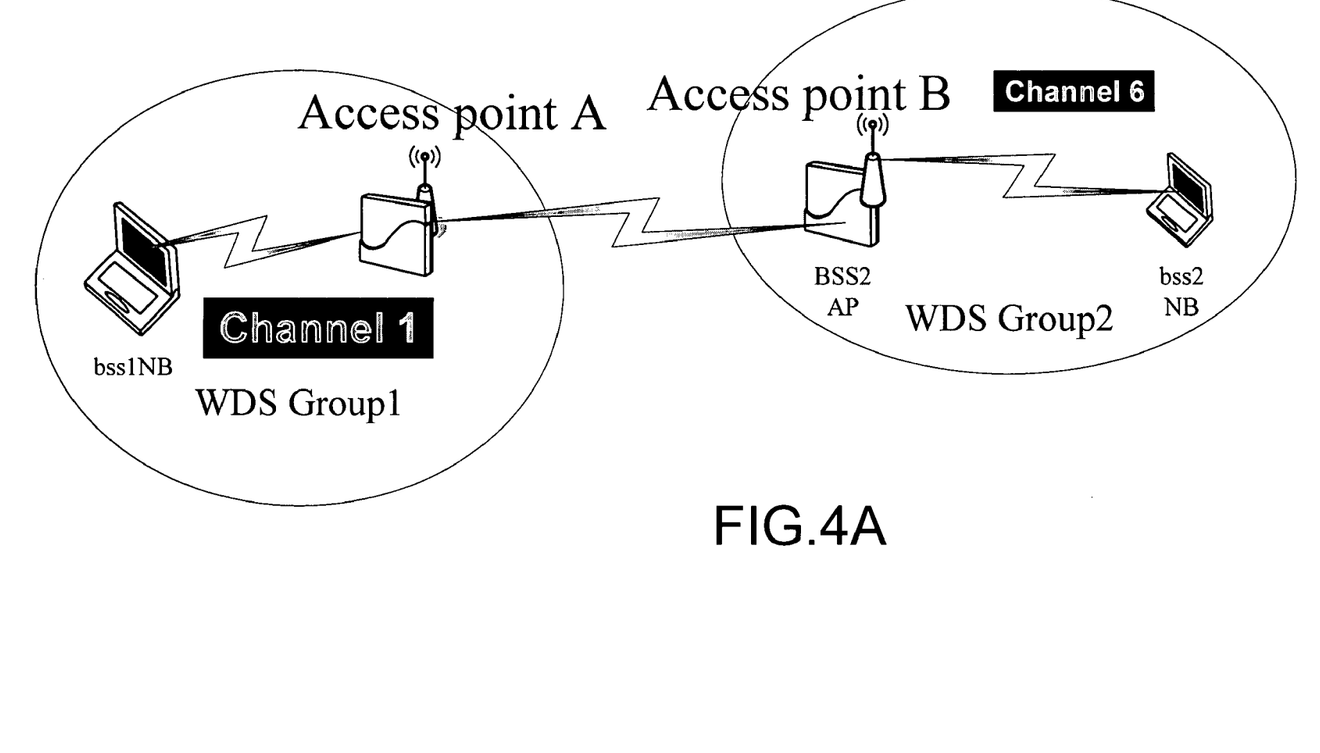
FIG. 4A shows a schematic view of a network architecture wherein node B in the existing WDS group is to join into another existing WDS group, and link with node A.

The chance of occurring is that, the two nodes to be built already have wireless networks they belong to and Root Nodes, and have finished the optimization. As shown in FIG. 4A, node A belongs to WDS Group 1, and uses channel 1; while node B1 belongs to WDS group 2, and uses channel 6. If a link is to be built between node A and node B belonging to different WDS networks respectively, since the channels used by the two groups are different, the building of WDS link will generate channel conflict, as well as the conflict between two root nodes.

Figure 4B:
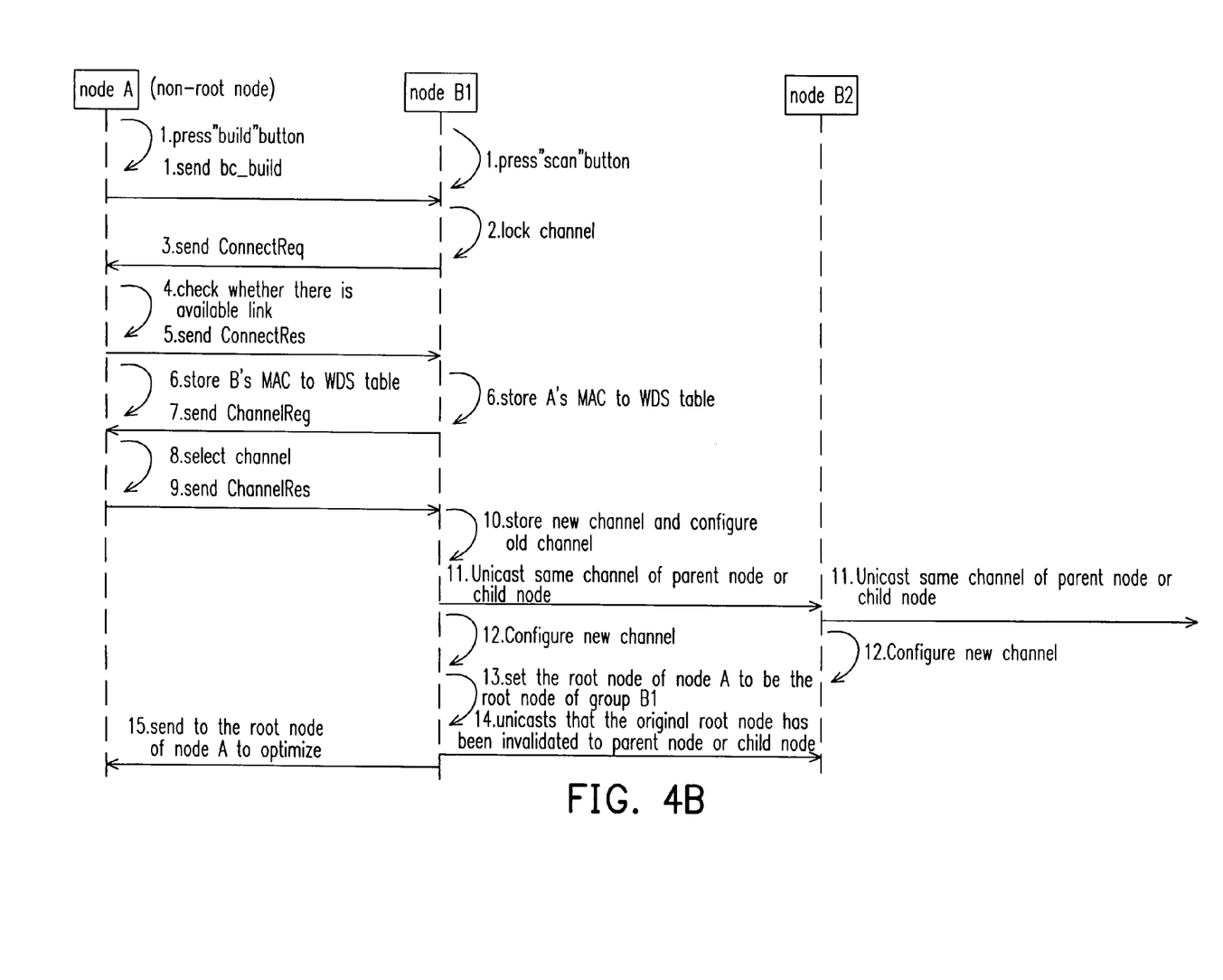
FIG. 4B shows the process flow of joining node B in the existing WDS group into another existing WDS group according to a preferred embodiment of the present invention.

In a preferred embodiment of the present invention, a method of how to build a WDS link between two nodes built in different WDS networks, and the detailed process refers to FIG. 4B.

Step 1: node A starts the building procedure and begins to broadcast bc_build, wherein the bc_build comprises the MAC address of node A, and the broadcasting time is between MinBuildTime and MaxBuildTime. And node B1 presses the button of reset and starts the scanning procedure, to scan according to listed channels in ScanChannelList, and the scanning time is between MinChannelScanTime and MaxChannelScanTime.

Step 2: after node B1 finishes the scanning, a ScanReport is obtained, in which the scanned result is listed, and node B1 will choose node A to be connected according to its Join strategy and lock the channel used by node A.

Step 3: node B1 sends connect request (ConnectReq, which comprises the MAC address of node B1) to node A.

Step 4: node A checks whether there is an available link or not: if there is one, the MAC address of node B1 is stored into an internal table of node A, which can be a WDS Table according to an alternative embodiment.

Step 5: if node A has an available link, it selects a link and assigns it to node B1, then sends ConnectRes to node B1.

Step 6: node A stores the MAC address of node B1 into the WDS table thereof. And node B1 also stores the MAC address of node A into the internal table thereof, which can be a WDS Table according to an alternative embodiment.

Step 7: node B1 sends ChannelReq to node A, requesting node A to assign a channel.

Step 8: node A selects an available channel.

Step 9: after node A selects the channel, it sends a ChannelRes to node B1.

Step 10: node B1 stores new channel and configures old channel.

Step 11: node B1 discoveries the occurrence of channel conflict according to the information sent by node A, and node B1 will unicast channel conflict message to parent node or child node in its original group, and request other nodes to change their channels. As shown in the drawing, node B2 belonging to the same WDS group with node B1 will also unicast the channel conflict message to parent node or child node when it received the channel conflict message unicast by node B1.

Step 12: after node B1 unicasts the channel conflict message to parent node or child node, configure a new channel. And the above node B2 will also configure a new channel.

Step 13: node B1 notifies its group to set the root node to be the root node of group A.

Step 14: node B1 unicasts the message that the original root node has been invalidated to parent node or child node.

Step 15: optimizes the root node sent to node A.

According to the above steps, a link can be built between node A and node B1 belonging to different WDS networks, and the channels used by the two groups will be the same, which will not cause the channel conflict, and the root node will be consistent.

Part Three: Optimize

Figure 5:
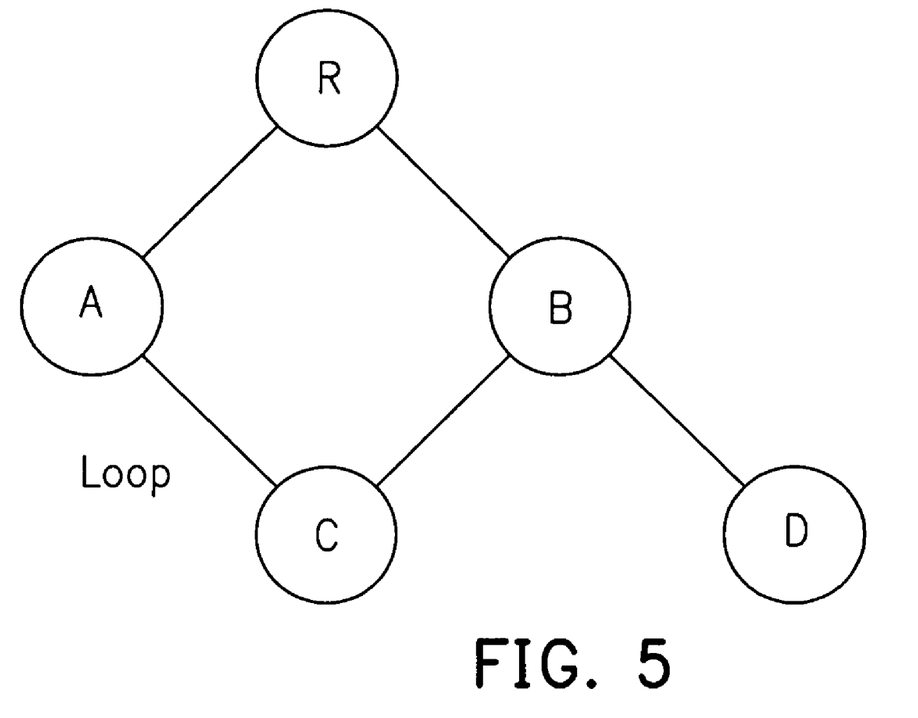
FIG. 5 shows a schematic view of a wireless distribution system (WDS) network architecture.

The present invention provides an optimize method of wireless distribution system (WDS). This optimize method can use algorithms employing central control or distributional optimize. Referring to FIG. 5, it shows a schematic view of WDS network architecture. As shown in the drawing, under the root node (R), node A and node B belong to the same layer, and node C and node D belong to the layer under node B, moreover, node C in turn belongs to the layer under node A, therefore, a Loop is generated. It will be described in combination of the WDS network architecture in FIG. 5.

Distributional Optimize

Figure 6:
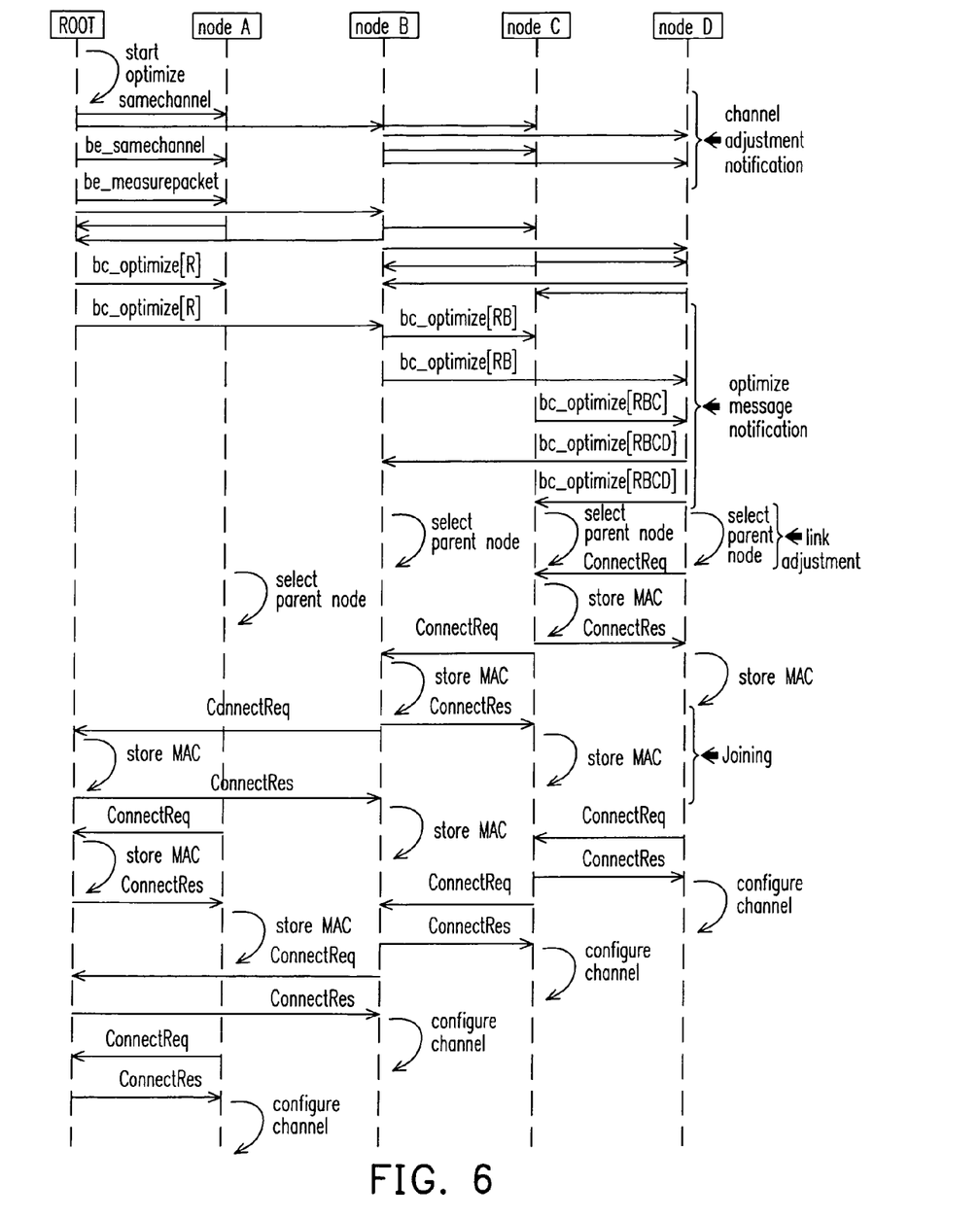
FIG. 6 shows the process flow of distributional optimize according to a preferred embodiment of the present invention.

The distributional optimize is directed to adjust the assignment of internal WDS links in a group, in order to avoid the generation of loop and the waste of resource. Referring to FIG. 6, and in combination with the WDS network architecture of FIG. 5, the distributional optimize algorithm in a preferred embodiment of the present invention is described respectively with the interaction between nodes. And ROOT in the drawing represents the root node.

First, root node ROOT notifies other nodes by unicast, requesting each node to adjust their channels to the same channel in MaxUCSameChannelTime, further, for example, each node will also unicast bc_sameChannel and bc_measurepacket in MaxBCSameChannelTime to collect adjacent information, such that the new nodes to be joined are optimized at the same time. As shown, the root node sends SameChannel signal to node A and node B, requesting them to adjust their channels to a same channel, and node B sends the signal to node C and node D to carry out the SameChannel adjustment. Further, bc_sameChannel signal and bc_measurepacket signal are also sent to node A~D to collect the adjacent information. This is shown as in the channel adjustment notification period marked in the right part of the drawing.

Thereafter, root node broadcasts optimize command bc_optimize in MaxBCOptimizeTime, comprising the available channels and the number of links for the root node, power of the root node, other information and the like. After the member has received bc_optimize, it will have its own message appended to the bc_optimize packet and continue to broadcast. After MaxBcOptimeTime is finished, each node will select a preferable parent node according to the message in the received bc_optimize packet.

Referring to FIG. 6, root node ROOT broadcasts the optimize command bc_optimize[R], wherein [R] represents the available channels and the number of links for the root node, power of the root node, other information and the like. After bc_optimize[R] is sent to node A and node B, node B broadcasts optimize command bc_optimize[RB] to node C and node D, wherein [RB] indicates that besides the available channels and the number of links for the root node, power of the root node, other information and the like, the message of node B is further appended to the bc_optimize packet and it will continue to broadcast.

Thereafter, in the same manner, node C broadcast optimize command bc_optimize[RBC] to other nodes, for example node D, wherein [RBC] indicates that besides the available channels and the number of links for the root node, power of the root node, other information and the like, the message of node C is further appended to the bc_optimize packet and it will continue to broadcast. And node D broadcasts optimize command bc_optimize[RBCD] to other nodes, for example node B and node C, wherein [RBCD] indicates that besides the available channels and the number of links for the root node, power of the root node, other information and the like, the message of node D is further appended to the bc_optimize packet and it will continue to broadcast. This is shown as in the optimized message notification period marked in the right part of the drawing.

Thereafter, the selection of Parent node is carried out, then the Joining procedure as described in Part one is carried out. This is as shown in the internal table of adjusting as marked in the right part of the drawing, which can be the WDS Table thereof according to an alternative embodiment, and channel adjusting period. All nodes A, B, C and D and the like are joined into the WDS network architecture under the root directory.

Central Control Optimize

The object of central control optimize is the same as that of the distributional optimize, and is to allow the root node to discovery a WDS path optimized for the whole network.

Figure 7:
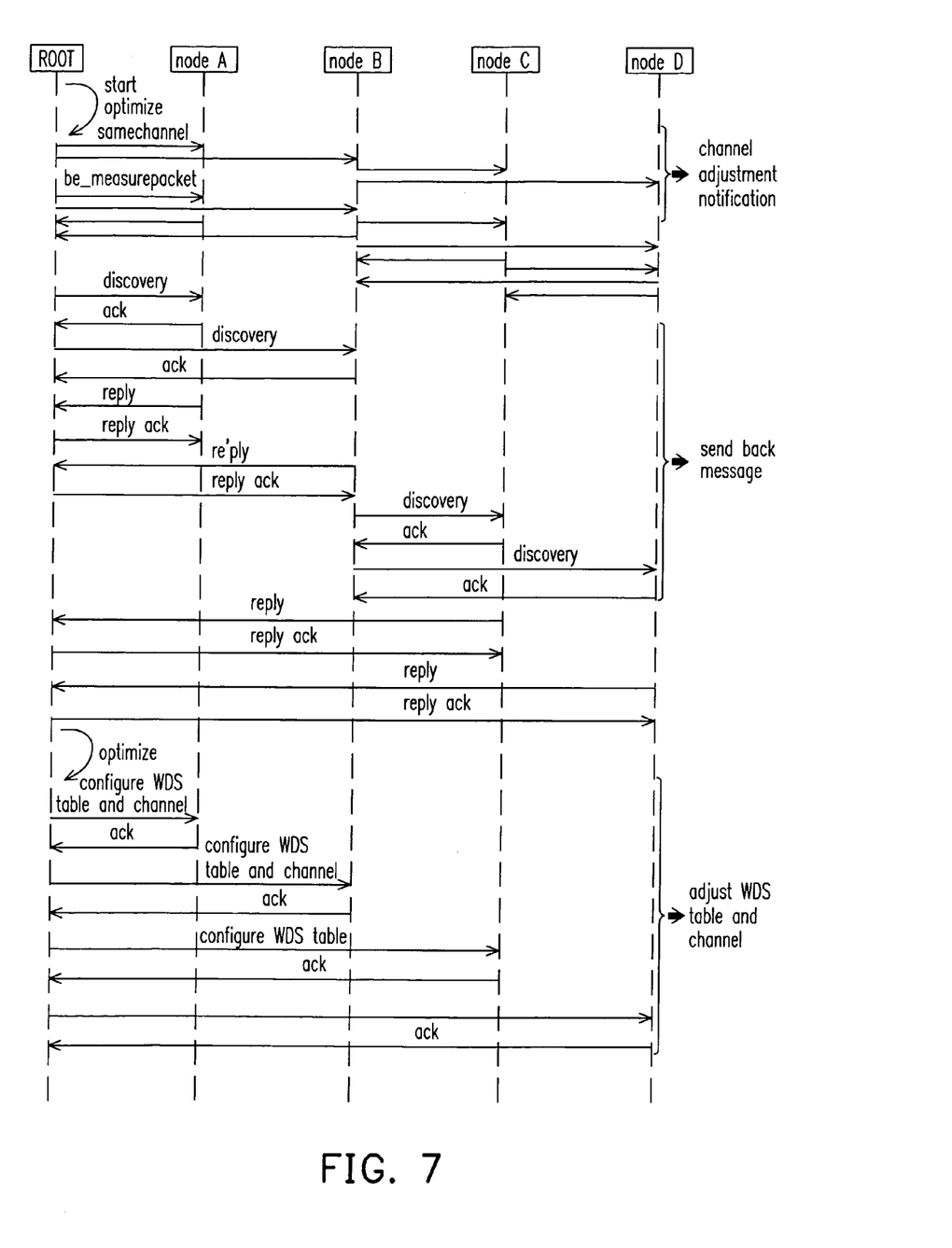
FIG. 7 shows the process flow of central control optimize according to a preferred embodiment of the present invention.

Referring to FIG. 7, and in combination with the WDS network architecture of FIG. 5, the central control optimize algorithm of a preferred embodiment of the present invention is described respectively with the interactions between nodes. And ROOT in the drawings represents root node. First, the root node (Root) notifies other nodes by broadcast, requesting each node to adjust to a same channel in MaxUCSameChannelTime, besides, each node will also in turn broadcast bc_measurepacket to collect adjacent information, and prepare to perform central control optimize.

As shown, the root node sends SameChannel signal to node A and node B, requesting them to adjust their channels to the same channel, and node B sends the signal to node C and node D, to perform the SameChannel adjustment. Further, bc_measurepacket signal is then sent to nodes A~D to collect the adjacent information. This is shown as in the channel adjustment notification period marked in the right part of the drawing.

Thereafter, the root node ROOT sends Discovery message and returns Discovery acknowledge (as marked as ack in the drawing) through nodes, to give the resource and information of each node, including the messages of channel, power, link etc. As shown in FIG. 6, the root node sends discovery signal to node A and node B, requesting for the resource and information of each node, and then node A and node B reply the ack signal to the root directory ROOT respectively. And node B sends Discovery message to node C and node D, requesting for the resource and information of each node, and then node C and node D reply the ack signal to node B respectively.

Then, each node that has received the Discovery message will send the resource and information of itself, including the messages of channel, power, link etc, to the node sending the message with a "reply" signal, and then, it will receive a "reply ack" signal. As shown in FIG. 7, the root node ROOT sends a discovery signal to node A and node B, then, node A and node B will send their messages back to the root node ROOT with a "reply" signal, and the root node ROOT will in turn send a "reply ack" signal back to node A and node B. The node B sends a discovery signal to node C and node D, then, node C and node D will send their messages back to node B with a "reply" signal, and node B will in turn send a "reply ack" signal back to node C and node D. This is shown as in the information return period marked in right part of the drawing.

Then, the root node ROOT performs optimize calculation and sends the result to each node. Each node changes its internal table, which can be the WDS Table according to an alternative embodiment, according to the message sent by the root node, and rebuilds a WDS link, to realize the optimized configuration.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following and their equivalents.

What is claimed is:

1. A method for configuring a wireless distribution system, the method comprising:
   starting a building procedure and beginning to broadcast a building information by a target node, wherein the building information comprises a media access control (MAC) address of the target node;
   starting a scanning procedure by a joining node, to obtain and lock the target node;
   sending a connect request signal to the target node by the joining node;
   selecting an available link by the target node if the target node has at least one or more available links, assigning the selected link to the joining node and then sending a connect acknowledge signal to the joining node;
   sending a channel assign request to the target node by the joining node, and requesting the target node to assign a channel;
   selecting the channel by the target node and sending a channel reset signal to the joining node, and storing a MAC address of the joining node into an internal table of the target node; and
   after receiving the channel reset signal by the joining node, storing the MAC address of the target node into an internal table of the joining node, and configuring the channel; and
   if the target node has no available link to be assigned to the joining node, a ConnectRes(Fail) signal is sent by the target node to the joining node, and the target node and the joining node can not communicate with each other.

2. The method of claim 1, wherein the scanning procedure of the joining node performs scanning to all the channels listed in a scan channel list, and after a scan report is obtained, obtains and locks one channel used by the target node according to the scan report.

3. A method for configuring a wireless distribution system, the method comprising:
   starting a building procedure and beginning to broadcast a building information by a target node belonging to a first wireless distribution system network, wherein the building information comprises a MAC address of the target node;
   starting a scanning procedure by a joining node belonging to a second wireless distribution system network, to obtain and lock the target node;
   sending a connect request signal to the target node by the joining node;
   selecting a link and assigning the link to the joining node by the target node, and then sending a connect acknowledge signal to the joining node;
   sending a channel assign request to the target node by the joining node, and requesting the target node to assign a channel;
   selecting the channel by the target node and sending a channel reset signal to the joining node, and storing a MAC address of the joining node into an internal table of the target node; and
   after receiving the channel reset signal by the joining node, storing the MAC address of the target node into an internal table of the joining node, and configuring the channel;
   wherein if the joining node discoveries an occurrence of channel conflict according to the channel reset signal of the target node, the joining node unicasts a channel conflict message to other nodes in the second wireless distribution system network for requesting the other nodes to change their channels, and the other nodes that have received the channel conflict message also in turn unicast the channel conflict message, and the joining node further requests the other nodes to set a root node of the first wireless distribution system network as a root node of the second wireless distribution system network.

4. The method of claim 3, wherein the scanning procedure of joining node performs scanning to all the channels listed in a scan channel list, and after a scan report is obtained, obtains and locks one channel used by the target node according to the scan report.

5. The method of claim 3, wherein if the target node has no available link to be assigned to the joining node, a ConnectRes(Fail) signal is sent by the target node to the joining node, and the target node and the joining node can not communicate with each other.

* * * * *